Figure 1:
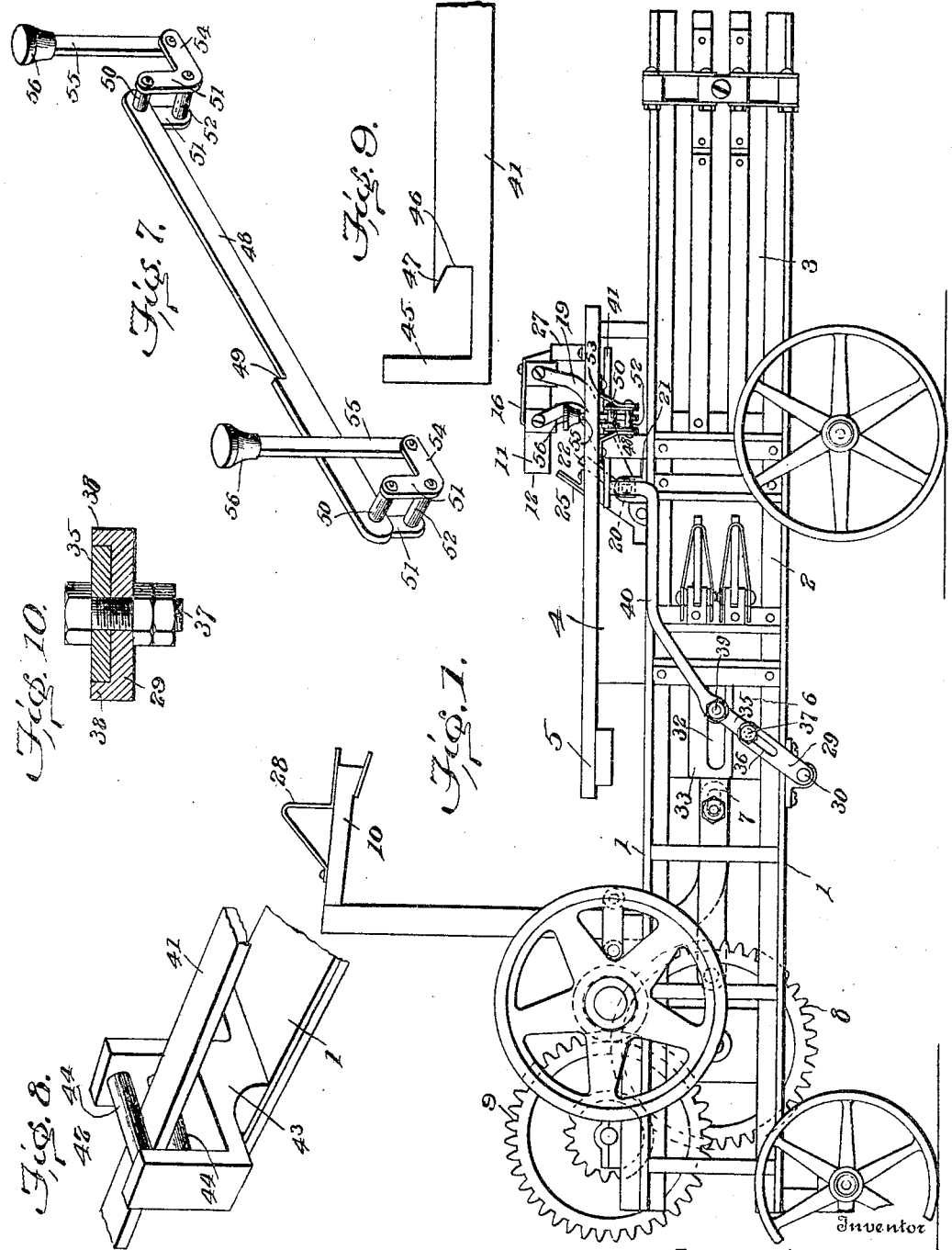

No. 801,343. PATENTED OCT. 10, 1905.
A. E. SKADDEN.
HAY PRESS.
APPLICATION FILED JULY 3, 1905.

3 SHEETS—SHEET 1.

Witnesses
G. Howard Walmsley.
Irvine Miller.

Inventor
Arthur E. Skadden,
By H. A. Toulmin,
Attorney

No. 801,343. PATENTED OCT. 10, 1905.
A. E. SKADDEN.
HAY PRESS.
APPLICATION FILED JULY 3, 1905.
3 SHEETS—SHEET 2.
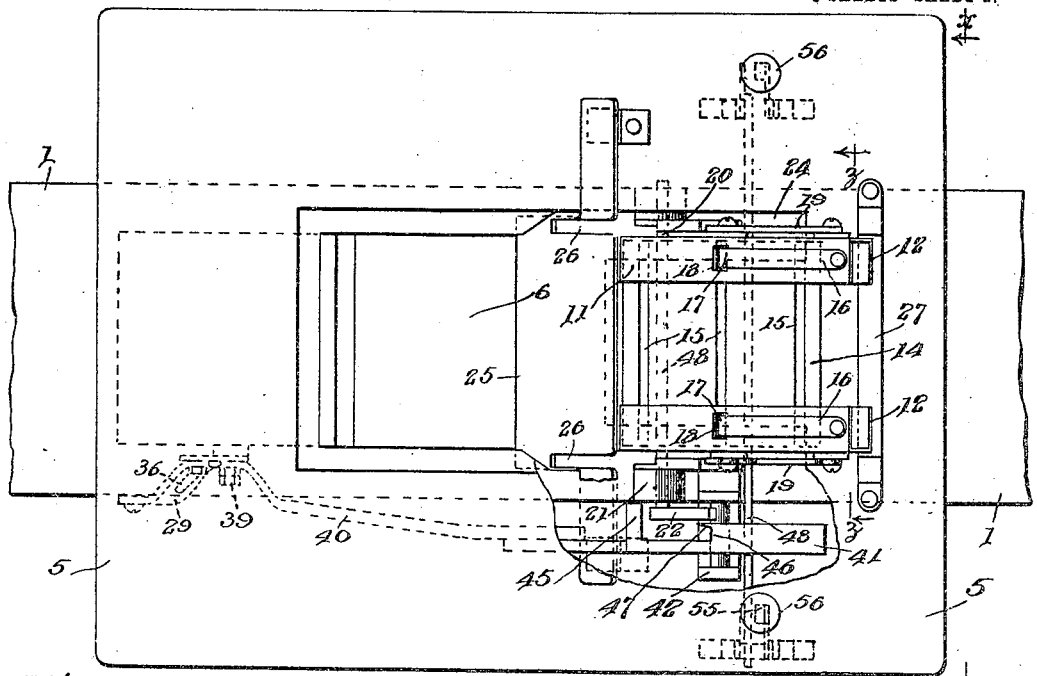
Fig. 2.
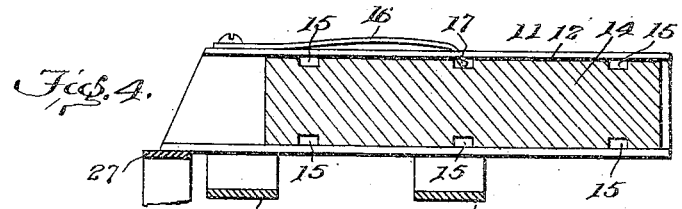
Fig. 4.
Fig. 3.
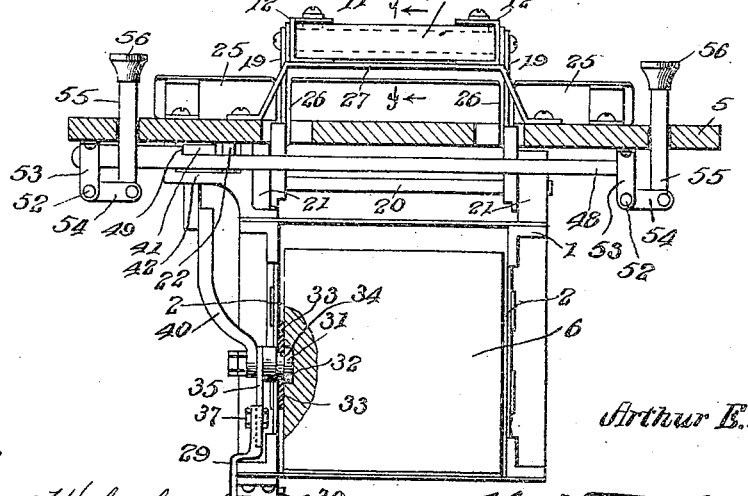
Witnesses
G. Howard Walmsley,
Irene Miller.
Inventor
Arthur E. Skadden,
By H. A. Toulmin,
Attorney

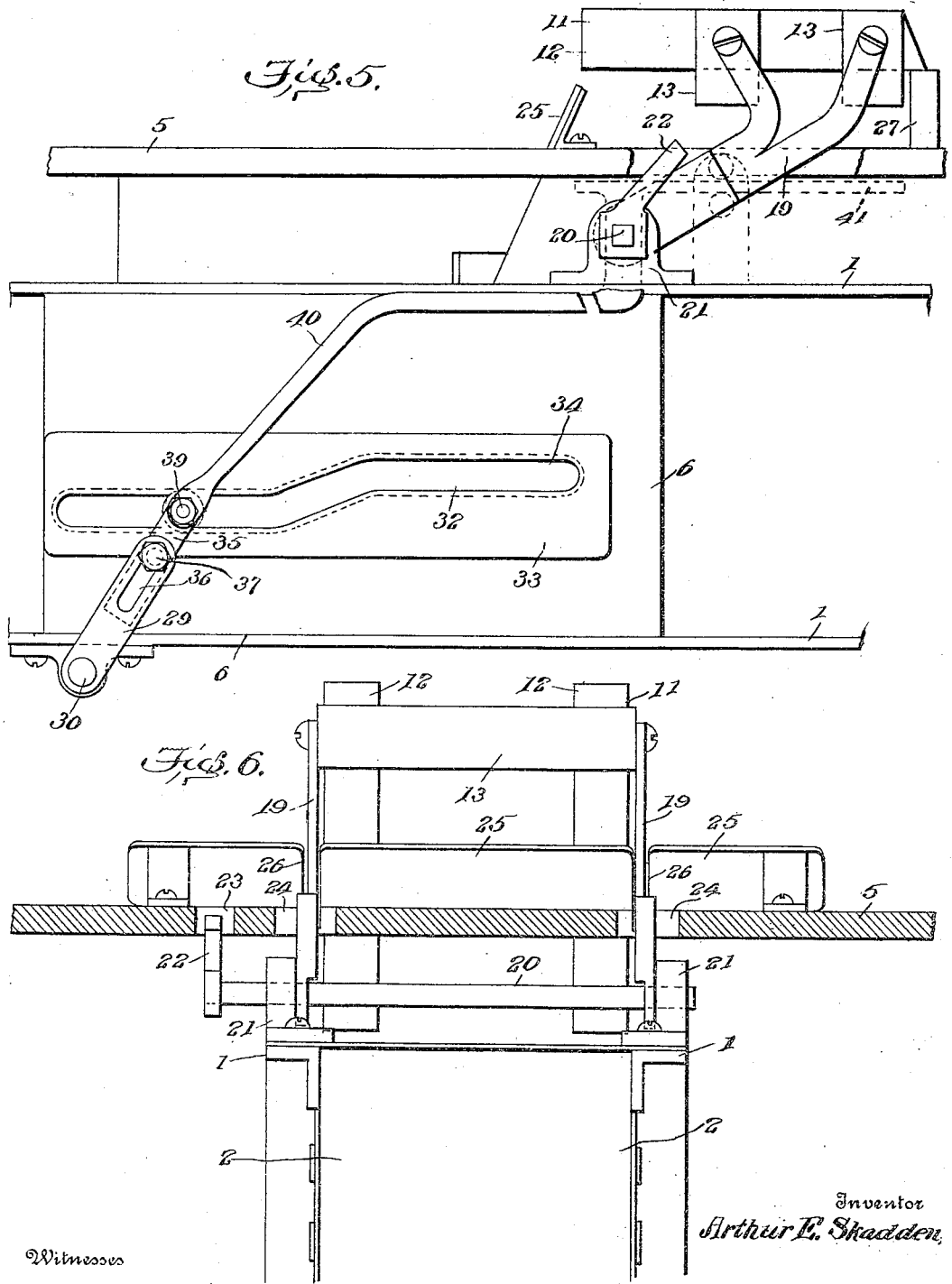

UNITED STATES PATENT OFFICE.

ARTHUR E. SKADDEN, OF BELLEVUE, OHIO, ASSIGNOR TO THE OHIO CULTIVATOR COMPANY, OF BELLEVUE, OHIO, A CORPORATION OF OHIO.

HAY-PRESS.

No. 801,343.      Specification of Letters Patent.      Patented Oct. 10, 1905.

Application filed July 3, 1905. Serial No. 268,075.

*To all whom it may concern:*

Be it known that I, ARTHUR E. SKADDEN, a citizen of the United States, residing at Bellevue, in the county of Huron and State of Ohio, have invented certain new and useful Improvements in Hay-Presses, of which the following is a specification, reference being had therein to the accompanying drawings.

This invention relates to hay-presses, and has for its object to provide an automatic mechanism for placing in position between the bales of hay the division-blocks which are used to separate said bales.

More specifically, the object of my invention in its preferred form is to provide a mechanism to accomplish this result which will be normally inoperative, but which may be connected with the power-operated mechanism of the press at any time at the will of the operator by the mere pressure of his foot and when so connected will be actuated by said power mechanism in such a way as to place the division-block in position, the parts then returning automatically to their original position ready to receive and deliver another division-block and remaining inoperative until again connected with the power-actuated mechanism of the press.

To these ends my invention consists in certain novel features, which I will now proceed to describe and will then particularly point out in the claims.

In the accompanying drawings, Figure 1 is a side elevation of a hay-press of approved construction having applied thereto one embodiment of my invention. Fig. 2 is a plan view of the central portion of the same, a portion of the deck being broken away to show the underlying construction. Fig. 3 is a detail sectional view taken on the line *x x* of Fig. 2 and looking in the direction of the arrows, the deck being partly broken away. Fig. 4 is an enlarged detail sectional view through the division-board holder and its support, a division-board being shown in position therein, the same being in section upon a line corresponding with the line *y y* of Fig. 3 and looking in the direction of the arrows. Fig. 5 is an enlarged detail view of a part of what is shown in Fig. 1, portions of the mechanism being broken away to show the construction lying beyond the same. Fig. 6 is a detail sectional view taken on the line *z z* of Fig. 2 and looking in the direction of the arrows, showing the division-board holder and its supporting mechanism, the same being shown in the position which they assume during the placing or delivery of a division-board and the actuating mechanism being omitted in order to more clearly show the construction. Fig. 7 is a detail perspective view of the shifting bar, its operating-lever, and the foot-pieces or treadles whereby said bar is actuated. Fig. 8 is a detail perspective view of the guide for the actuating-rod. Fig. 9 is a detail plan view of the actuating head or plate carried by said rod detached, and Fig. 10 is a detail cross-sectional view of the vibrating lever or arm.

Referring to said drawings, 1 indicates the frame of the machine, having the usual press-chamber or baling-chamber 2, with its delivery extension 3, in which the bales are tied, and feeding-hopper 4, surrounded by the platform 5, on which platform stands the operator, who delivers the hay into the feeding-hopper. Since the press may present either of its sides to the hay-supply, the platform extends on each side of the hopper, so that the operator may take a station on either side of the machine. 6 indicates the plunger or traverser, driven by means of a pitman 7 from the crank-pin connecting the double gears 8, which latter are driven from any suitable source of power through the medium of the gearing 9 shown. 10 indicates the rammer or feeder, connected to the pitman 7 and so actuated as to descend into the feeding-hopper and press-chamber when the plunger or traverser 6 is withdrawn. All of these parts may be of any approved construction, that shown being chosen solely for the purpose of illustration.

Referring now more particularly to the features which constitute my present invention, 11 indicates as a whole the block-holder, the same comprising two parallel grooved guideways or holders 12, connected by cross-pieces 13 and adapted to receive and guide between them a division-block 14. These division-blocks, of which any suitable number is employed, may be of any approved construction and are provided with grooves 15, extending transversely across both of their faces, said grooves being primarily for the purpose of permitting the introduction and passage between the bales of the ties whereby the bales are secured after their formation. The normal position of the block-holder is the horizontal position shown in all of the figures except Fig. 6; but said block-holder is adapted to be tilted into the upright position shown in Fig. 6, and in order to retain the division-block in its holder when the latter is in said upright position until the proper moment for the delivery of said blocks into the baling-chamber I provide the guides 12 with detent-springs 16, secured, preferably, to their upper sides at one end and having their other ends bent downward, as shown at 17, and passing through apertures 18 in the tops of the guides, so as to engage one of the grooves 15 of the block 14, and thereby hold said block against accidental displacement and prevent it from dropping out of the holder prematurely when the latter is upright.

The holder is connected, by means of arms 19, to a rock-shaft 20, mounted in bearings 21 on the frame 1. The rock-shaft 20 has one end thereof extended beyond its bearing 21, and said extended end has secured thereon an actuating-arm 22. In the present instance the space between the rock-shaft and platform 5 is shown as comparatively small for compactness sake, and the platform is therefore shown as provided with a slot 23 to accommodate the free end of the guiding-arm 22. The deck 5 is provided with slots 24, through which the arms 19 pass, and the rear wall of the hopper, shown in the present instance as formed by an inclined guard-plate 25, is also slotted, as shown at 26, for the passage of said arms 19. At the rear of the platform there is provided a raised support 27, on which the rear or upper end of the board-holder rests when in its normal or horizontal position.

When the board-holder, with a division-board therein, is in the upright position hereinbefore referred to, it stands within the hopper in a substantially vertical position, with the division-board in the path of the feeder or rammer 10, which latter may be provided with a projection 28, so constructed and arranged as to engage the upper edge of the board and force the same downward into the baling-chamber to the position which it is desired to give it. My invention comprises an actuating mechanism driven from the power-actuated mechanism of the press and adapted to be connected at the will of the operator to the board-holder, so as to move the same from its horizontal to its vertical position, so as to cause the delivery of a division-board at the desired time and place. This mechanism I will now proceed to describe.

The actuating mechanism may derive its motion from any of the power-driven parts of the press; but I prefer the construction shown, in which the plunger or traverser 6 is employed for this purpose. 29 indicates a lever pivoted to the frame 1 at 30, said lever carrying at its upper end a roller 31, which travels in a cam-groove 32 in the side of the plunger. The cam-groove is preferably covered by a plate 33, having a corresponding cam-slot 34 therein of less width than the cam-groove and roller, so as to hold this latter in place in the groove. The lever 29 is preferably extensible for the purpose of adjusting its length to accommodate the wear of the plunger. Said plunger becomes worn on its under side from use, thereby bringing the cam-groove therein closer to the pivotal axis 30 of the lever, and in order to maintain the proper angular relations of the lever throughout the movement of the plunger I have provided means for shortening the same to compensate for this wear. To this end the body portion 29 of the lever receives an adjustable extension 35 and is slotted, as shown at 36, to receive a clamping-bolt 37, by means of which the two parts are clamped together after adjustment. Preferably the body 29 is grooved longitudinally to form guide-flanges 38, which maintain the extension in alinement with the said body. By reason of this construction the lever 29 may be readily shortened as the wear of the plunger may require. To the free end of the lever 29 there is pivoted at 39 the forward end of an actuating-rod 40, which extends upward and rearward toward the rock-shaft 20, on which the holder is mounted, its rear end being provided with an actuating head or plate 41, which slides horizontally in a guide 42, composed of a bracket 43, secured to the top rail of the frame 1 and carrying two rollers 44, between which the head 41 is guided, so as to prevent vertical movement thereof. The head 41 is provided at one end with an arm or finger 45, in the path of which the actuating-arm 22 lies, so that when said actuating-arm is moved rearward said finger 45 will engage the arm 22 in case the holder is in its upright or vertical position and will so turn the rock-shaft 20 as to throw the holder back into horizontal position upon its support 27. The head 41 is further provided with a shoulder or engaging surface 46, terminating in a locking projection 47. The actuating-rod and its head are capable of lateral motion, the guide 42 being of a width sufficient to permit such motion and said rod and head being normally held outward or away from the arm 22, as shown in Fig. 2, so that the actuating-head is free to move back and forth without its engaging surface 46 coming into contact with said arm 22. The maintaining of the actuating-head in this path is effected in the present instance by the inherent resilience of the actuating-rod 40; but it may obviously be effected in other ways—as, for instance, by a separate spring or springs. This constitutes the inoperative position of the actuating parts, during which the actuating-rod and its head may move forward and back without in any way affecting the holder when the latter is in its normal or horizontal position, its only effect when in this position being to return the holder to its horizontal position if it has been displaced therefrom. I provide means whereby the actuating-rod and its head may be shifted laterally into a position such that its engaging surface 46 may be brought into contact with the arm 22 during the forward movement of these parts. This mechanism consists of a shifting-bar 48, extending transversely of the machine immediately below the head 41 and provided with a shoulder 49, which bears against the outer edge of said head. This shifting bar is mounted at each end upon a pivot 50, connecting the upper ends of two links 51, secured on a shaft 52, which is mounted in brackets 53 on the under side of the platform 5, a pair of these brackets being located at each side of the machine. One link or arm 51 of each pair is provided with a right-angled extension 54, constituting said parts, in effect, a bell-crank lever, to the free end of which is pivotally connected a push-rod 55, extended upward through an aperture in the deck and provided at its upper end with a foot-piece or treadle 56. There are thus provided two of these push-rods and foot-pieces, one located on each side of the platform. They are held normally raised by the lateral pressure of the actuating-rod head against the shoulder 49. Downward pressure upon either of them will move the shifting bar in the direction of its length and transversely of the machine, and the shoulder 49 will move the actuating-head 41 inward until its projection 47 travels in a path lying inside of the arm 22, its contact-surface 46 traveling in a path such as to engage said arm. The parts being held in this position by the foot of the operator until the rearward movement of the head causes the engaging surface 46 to come into contact with the arm 22, the projection 47 will hold the parts in this relation, and as the rearward movement of the actuating rod and head continues the rock-shaft 20 will be so turned as to bring the block-holder into upright position. This occurs during the rearward or outward motion of the plunger or traverser after the hay in the pressing-chamber has been pressed and before the feeder or rammer has descended sufficiently to cause it to engage the block. As the feeder or rammer continues to descend it finally engages the block and releasing the detents 16, which yield from their own resilience, forces the block down into position within the pressing-chamber. Upon the return or forward stroke of the actuating-head the arm 45 will return the holder to its horizontal position, and said head will move forward after the arm 22 has ceased to move until the projection 47 passes clear of said arm, whereupon the actuating-head will return to its normal path of movement and the holder will not be operated again until one or the other of the foot-pieces is depressed.

It will be seen that the labor of swinging the holder into and out of position is performed entirely by the power which operates the press, relieving the operator of this work and enabling him to attend to other matters. The operation of throwing into connection the actuating mechanism may be performed from either side of the machine, so that the operator does not have to shift his position when it is desired to insert a division-block. Although not essential, it is preferred that the shifting mechanism be operated by foot in the manner described, since it leaves the operator's hands free for any other effective work, such as the supplying of hay to the feeding-hopper. It will also be noted that it is only necessary to momentarily depress one of the foot-pieces, it being only necessary to hold the same down for a sufficient length of time during the rearward motion of the actuating-head to cause the same to interlock with the actuating-arm, whereupon said parts will remain interlocked as long as is necessary to effect the desired movement of the parts and will automatically disengage themselves at the proper time.

It will be understood, of course, that a second operator ties the bales while in the baling-chamber, the division-boards facilitating this operation in the manner already referred to. This second operator after the bales and boards are discharged from the machine successively places the boards in the holder as they are needed.

I do not wish to be understood as limiting myself strictly to the precise details of construction hereinbefore described, and shown in the accompanying drawings, as it is obvious that these details may be modified without departing from the principle of my invention.

Having thus fully described my invention, what I claim as new, and desire to secure by Letters Patent, is—

1. In a hay-press, the combination, with a press-chamber, a compressing-plunger and a feeder alternately entering and withdrawing from said chamber, and power-driven mechanism for actuating said plunger and feeder, of a division-board holder movable into and out of the path of the feeder, actuating mechanism for said holder connected with the power-driven mechanism of the press and normally disconnected from the holder, and means controlled by the operator for connecting said actuating mechanism with said holder to move the same into the path of the feeder, substantially as described.

2. In a hay-press, the combination, with a press-chamber, a compressing-plunger and a feeder alternately entering and withdrawing from said chamber, and power-driven mechanism for actuating said plunger and feeder, of a division-board holder located normally out of the path of the feeder and movable into said path, actuating mechanism for said holder connected with the power-driven mechanism of the press and normally disconnected from the holder, and means controlled by the operator for connecting said actuating mechanism with said holder to move the same into the path of the feeder, said actuating mechanism also serving to return the holder to its normal position, substantially as described.

3. In a hay-press, the combination, with a press-chamber, a compressing-plunger and a feeder alternately entering and withdrawing from said chamber, and power-driven mechanism for actuating said plunger and feeder, of a division-board holder movable into and out of the path of the feeder, actuating mechanism for said holder normally connected with the power-driven mechanism of the press and normally disconnected from the holder, means controlled by the operator for connecting said actuating mechanism with said holder to move the same into the path of the feeder, said actuating mechanism serving also to return said holder to its original position, and means for automatically disconnecting said actuating mechanism and holder after such return of the holder, substantially as described.

4. In a hay-press, the combination, with a press-chamber, a compressing-plunger and a feeder alternately entering and withdrawing from said chamber, and power-driven mechanism for actuating said plunger and feeder, of a division-board holder movable into and out of the path of the feeder, actuating mechanism for said holder connected with the power-driven mechanism of the press and normally disconnected from the holder, and means controlled by the operator for connecting said actuating mechanism with said holder to move the same into the path of the feeder, said controlling means comprising duplicate controlling devices located on both sides of the machine, whereby the holder may be controlled from either side of the machine, substantially as described.

5. In a hay-press, the combination, with a press-chamber, a compressing-plunger and a feeder alternately entering and withdrawing from said chamber, and power-driven mechanism for actuating said plunger and feeder, of a division-board holder movable into and out of the path of the feeder, actuating mechanism for said holder connected with the power-driven mechanism of the press and normally disconnected from the holder, and means controlled by the operator for connecting said actuating mechanism with said holder to move the same into the path of the feeder, said controlling means comprising foot-plates located on both sides of the machine-platform, whereby the holder may be controlled by the operator's foot from either side of the machine, substantially as described.

6. In a hay-press, the combination, with a press-chamber, a compressing-plunger and a feeder alternately entering and withdrawing from said chamber, and power-driven mechanism for actuating said plunger and feeder, of a division-board holder movable into and out of the path of the feeder, pivotally mounted adjacent to the receiving-mouth of the press-chamber and having an actuating-arm, an actuating-rod connected with the power-driven press mechanism so as to be reciprocated thereby and having an actuating-head adapted to engage the actuating-arm and traveling normally in a path adjacent to said arm, means controlled by the operator for moving said actuating-rod and head laterally to engage said arm, and means for automatically disengaging said parts at the end of each complete effective movement thereof, substantially as described.

7. In a hay-press, the combination, with a press-chamber, a compressing-plunger and a feeder alternately entering and withdrawing from said chamber, and power-driven mechanism for actuating said plunger and feeder, of a division-board holder pivotally mounted adjacent to the receiving-mouth of the press-chamber and having an actuating-arm moving in unison therewith, an actuating-rod connected with and reciprocated by the power-driven mechanism of the press and having an actuating-head adapted to engage said actuating-arm and traveling normally in a path adjacent thereto, a shifting-bar engaging said head to move the same laterally to engage the actuating-arm, and operating means whereby the operator may actuate said shifting-bar, substantially as described.

8. In a hay-press, the combination, with a press-chamber, a compressing-plunger and a feeder alternately entering and withdrawing from said chamber, and power-driven mechanism for actuating said plunger and feeder, of a division-board holder pivotally mounted adjacent to the receiving-mouth of the press-chamber and having an actuating-arm moving in unison therewith, an actuating-rod connected with and reciprocated by the power-driven mechanism of the press and having an actuating-head adapted to engage said actuating-arm and traveling normally in a path adjacent thereto, a shifting-bar engaging said head to move the same laterally to engage the actuating-arm, and operating means whereby the operator may actuate said shifting-bar, said operating means being located in duplicate on both sides of the machine, substantially as described.

9. In a hay-press, mechanism for operating a division-board holder, comprising a pivotally-mounted holder having an actuating-arm in unison with which it moves, an actuating-plate reciprocated by the power mechanism of the press, and means for shifting said actuating-plate laterally to vary its path of travel, said plate having a finger to engage the actuating-arm in one direction, and having an engaging surface adapted to engage the actuating-arm in the opposite direction when the plate is shifted from its normal path, substantially as described.

10. In a hay-press, mechanism for operating a division-board holder, comprising a pivotally-mounted holder having an actuating-arm in unison with which it moves, an actuating-plate reciprocated by the power mechanism of the press, and means for shifting said actuating-plate laterally to vary its path of travel, said plate having a finger to engage the actuating-arm in one direction, and having an engaging surface adapted to engage the actuating-arm in the opposite direction when the plate is shifted from its normal path, said engaging plate being spring-actuated to cause it to tend to return to its normal path, said engaging surface being provided with a locking projection to hold the parts in engagement until said projection passes clear of the actuating-arm on the return stroke of the plate, substantially as described.

11. In a hay-press, mechanism for actuating a division-block holder, comprising a pivotally-mounted holder having an actuating-arm with which it moves in unison, a power-driven actuating-rod reciprocating normally at one side of the actuating-arm and having an actuating-head adapted to engage the same, and a shifting-bar extending across the machine and having a shoulder to engage said actuating-plate to shift the same laterally, said shifting-bar being provided with actuating bell-crank levers and push-rods connected therewith at each end on both sides of the machine, substantially as described.

12. In a hay-press, a frame provided with a press-chamber, a feeding-hopper, and a deck surrounding said feeding-hopper, said deck and hopper being slotted as described, in combination with a rock-shaft mounted on said frame below the deck, a division-block holder supported by arms extending through said slots, and means for actuating said rock-shaft to swing the holder from a horizontal position above the deck into an upright position in the receiving-hopper, substantially as described.

13. In a hay-press, the combination, with a press-chamber, a compressing-plunger and a feeder alternately entering and withdrawing from said chamber, and power-driven mechanism for actuating said plunger and feeder, of a division-board holder movable into and out of the path of the feeder, and actuating mechanism for said holder adapted to be connected therewith and disconnected therefrom at the will of the operator, said actuating mechanism comprising a cam-slot in the plunger, a vibrating arm having its free end engaged with said slot, and an actuating-rod pivoted to said vibrating arm at one end and suitably guided at its other end to engage and actuate the holder, substantially as described.

14. In a hay-press, the combination, with a compressing-plunger having a cam-slot, a division-block holder, and an actuating-rod therefor, of a vibrating arm pivoted on the press-frame, having the actuating-rod connected thereto, and provided with a part engaging the cam-slot, and means for adjusting the distance between said engaging part and the pivot of the vibrating arm to compensate for the wear of the plunger, substantially as described.

In testimony whereof I affix my signature in presence of two witnesses.

ARTHUR E. SKADDEN.

Witnesses:
D. V. BOOKER,
C. W. HALLOWAY.